(12) United States Patent
Hacikyan

(10) Patent No.: US 8,485,560 B2
(45) Date of Patent: Jul. 16, 2013

(54) WELDING SPACER

(76) Inventor: Michael Hacikyan, Amherst, NY (US)

(*) Notice: Subject to any disclaimer, the term of this patent is extended or adjusted under 35 U.S.C. 154(b) by 896 days.

(21) Appl. No.: 12/266,651

(22) Filed: Nov. 7, 2008

(65) Prior Publication Data

US 2010/0117351 A1 May 13, 2010

(51) Int. Cl.
*F16L 13/02* (2006.01)

(52) U.S. Cl.
USPC ............................. 285/22; 285/340; 285/399

(58) Field of Classification Search
USPC ............ 285/22, 288.1, 331, 339, 321, 399, 285/340, 902; 470/3–4, 42; 411/520–521, 411/526
See application file for complete search history.

(56) References Cited

U.S. PATENT DOCUMENTS

| | | | | |
|---|---|---|---|---|
| 2,275,058 | A * | 3/1942 | Draving | 411/521 |
| 2,712,262 | A * | 7/1955 | Knohl | 411/521 |
| 2,739,615 | A * | 3/1956 | Wurzel | 285/223 |
| 3,320,846 | A * | 5/1967 | Orain | 411/521 |
| 3,954,541 | A * | 5/1976 | Landgraf | 156/274.2 |
| 4,346,918 | A | 8/1982 | Lycan | |
| 4,505,420 | A | 3/1985 | Wittenbach | |
| 4,586,734 | A * | 5/1986 | Grenier | 285/340 |
| 4,674,772 | A | 6/1987 | Lycan | |
| 6,059,320 | A | 5/2000 | Lycan | |
| D494,056 | S * | 8/2004 | Clendenning | D8/399 |
| 6,820,291 | B1 * | 11/2004 | Weaver | 4/695 |
| 6,913,292 | B2 * | 7/2005 | Snyder et al. | 285/340 |
| 2003/0067170 | A1 * | 4/2003 | Snyder et al. | 285/340 |
| 2004/0253050 | A1 * | 12/2004 | Eidam | 403/315 |

FOREIGN PATENT DOCUMENTS

GB 2120150 A 11/1983

OTHER PUBLICATIONS

Shur-Gap, AB Paper Company, downloaded on Sep. 25, 2008 from URL <http://apcompany1005.qwestoffice.net/>, 1 page.
CIPO, Requisition by Examiner, Canadian Patent Application No. 2,649,980, Oct. 28, 2010, 4 pages.
CIPO, Response to Office Action, Canadian Patent Application No. 2,649,980, Apr. 26, 2011, 18 pages.

* cited by examiner

*Primary Examiner* — Aaron Dunwoody
*Assistant Examiner* — Fannie Kee
(74) *Attorney, Agent, or Firm* — Walter W. Duft

(57) ABSTRACT

A welding spacer includes a spacer body having a first pipe-engaging face and a second socket-engaging face. The spacer may be formed from any suitable material, including a liquid-degradable or heat-degradable composition. A spacer thickness separates the first face and the second face. The spacer thickness may comprise solid material or it may have one or more hollow portions. A peripheral edge is provided on the spacer body. One or more deformable members may be provided on the peripheral edge for retaining the spacer in a structure. The welding spacer may be incorporated in a pipe assembly that includes a first pipe segment and a second pipe segment. The first pipe segment has a socket at a first pipe end with an interior shoulder to seat the welding spacer. The second pipe segment has a second pipe end that is received in the socket and seated against the welding spacer.

19 Claims, 6 Drawing Sheets

WELDING SPACER

BACKGROUND OF THE INVENTION

1. Field of the Invention

The present invention relates generally to welding. More particularly, the invention is directed to spacers used during pipe welding.

2. Description of Prior Art

By way of background, when socket welding pipes, the end of one pipe is received in a socket formed on the other pipe. In order to accommodate thermal expansion and contraction, a gap should be maintained between the end of the pipe and the base of the socket. The size of the gap can be controlled by using a spacer. The spacer is inserted prior to welding to establish the desired gap spacing, then subsequently degrades. The present invention is directed to an improved welding spacer.

SUMMARY OF THE INVENTION

A welding spacer includes a spacer body having a first pipe-engaging face and a second socket-engaging face. The spacer may be formed from any suitable material, including a liquid-degradable or heat-degradable composition. A spacer thickness separates the first face and the second face. The spacer thickness may comprise solid material or it may have one or more hollow portions. A peripheral edge is provided on the spacer body. One or more deformable members may be provided on the peripheral edge for retaining the spacer in a structure. The welding spacer may be incorporated in a pipe assembly that includes a first pipe segment and a second pipe segment. The first pipe segment has a socket at a first pipe end with an interior shoulder to seat the welding spacer. The second pipe segment has a second pipe end that is received in the socket and seated against the welding spacer.

BRIEF DESCRIPTION OF THE DRAWINGS

The foregoing and other features and advantages of the invention will be apparent from the following more particular description of an example embodiment, as illustrated in the accompanying Drawings in which.

DETAILED DESCRIPTION OF PREFERRED EMBODIMENTS

Figure 1:
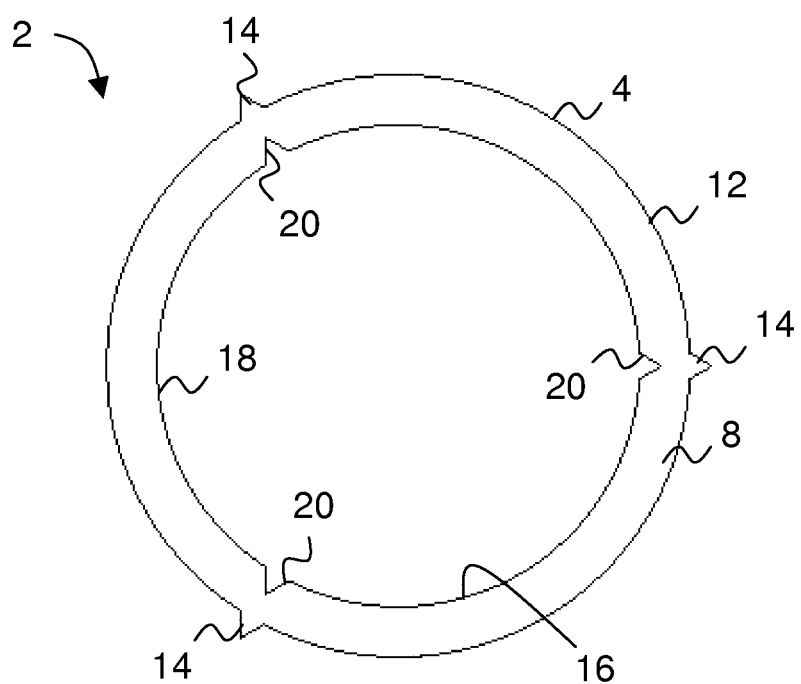
FIG. 1 is a plan view showing an example welding spacer.
Figure 2:
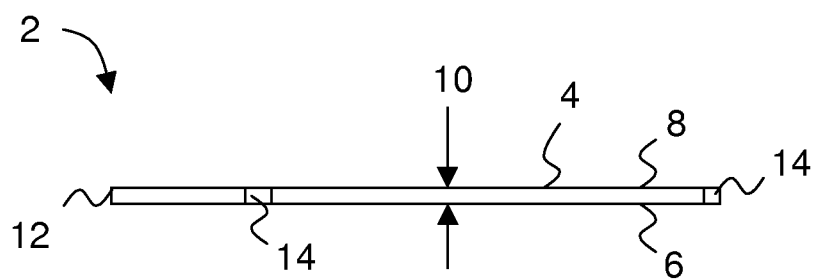
FIG. 2 is a side view of the welding spacer of FIG. 1.

Turning now to the Drawings, which are not necessarily to scale, FIGS. 1 and 2 illustrate one possible embodiment of a self-retaining welding spacer, generally identified by reference number 2. The welding spacer 2 includes a spacer body 4 that may be formed from any suitable material, including but not limited to, liquid-degradable material. Liquid-degradable material may comprise any suitable composition, including but not limited to, liquid-degradable paper, liquid-degradable polymer, and combinations of such materials. Water-soluble paper is one example of liquid-degradable paper that may be used. Polyvinyl alcohol film is one example of liquid-degradable polymer that may be used. Such materials are convenient because water is often used for pressure testing welded pipelines, or to flush welded pipelines prior to start up, and will thus clear the pipe of welding spacer material. A suitable water-soluble paper is commercially available from Aquasol Corporation of North Tonawanda, N.Y. under the trademark Aquasol®. The Aquasol® brand paper is made of Sodium Carboxy Methyl cellulose and wooden pulp that dissolves rapidly and completely in most liquids, including water. Non-water soluble paper, such as tissue paper, may also be used as a liquid-degradable welding spacer material. A heat-degradable spacer material could also be used, such as any of the synthetic resins disclosed in U.S. Pat. No. 4,505,420 of Wittenbach.

As can be seen in FIG. 2, the spacer body 4 is formed with a first pipe-engaging face 6 on one side of the spacer 2, and a second socket-engaging face 8 on the other side of the spacer. A spacer thickness 10 separates the first face 6 and said second face 8. The thickness 10 may be constant throughout the spacer body 4, or it may be of variable dimension. In the former configuration, the first face 6 and the second face 8 are substantially planar. In the latter configuration, there could be regions of the spacer body 4 that have different thickness. Some regions could be relatively thick and define a spacing thickness of the spacer 2. Other regions could be relatively thin in order to reduce the amount of spacer material. The spacer thickness may comprise solid material or it may have one or more hollow portions. A solid material is preferred if the spacer material is pliable (such as paper) in order to minimize collapse of the spacer thickness during use.

The spacer body 4 further includes an outer peripheral edge 12. A set of one or more deformable members may be arranged to extend radially outwardly from the peripheral edge 12. As described in more detail below in connection with FIGS. 4 and 5, the deformable members help maintain the welding spacer 2 in a structure, such as a pipe socket, during pipe assembly regardless of orientation. The deformable members may be of any number and of any desired shape. In the example spacer 2, the deformable members are provided by three deformable prongs 14 equally spaced around the peripheral edge 12. Although the prongs 14 are shown as being triangular, other prong shapes could also be used. There could also be a larger or smaller number of prongs 14. The prongs 14 are deformable due to the flexibility of the material used to form the spacer body 4, which is generally more pliant than the pipe socket material that deforms the prongs upon spacer insertion. Forming the prongs 14 as triangular elements with pointed tips facilitates deformation because the prong material is reduced in size at the tips, making the tips relatively pliable. Apart from the three prongs 14, the peripheral edge 12 is substantially circular. Other shapes could also be used.

Figure 3:
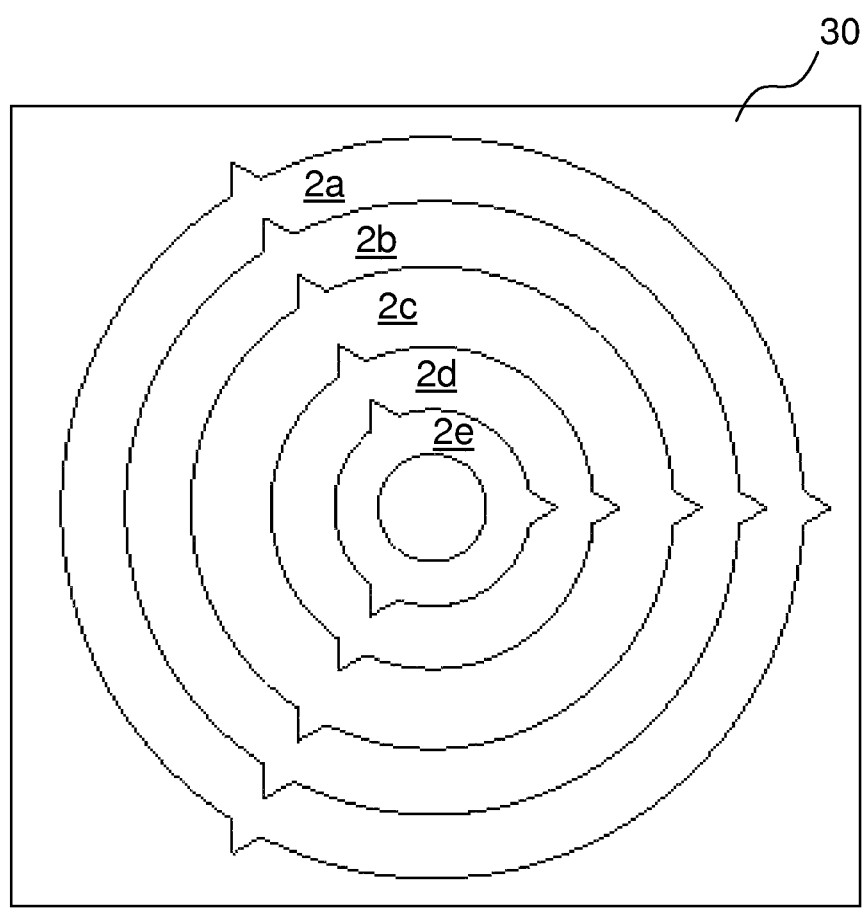
FIG. 3 is a plan view showing a sheet of material for fabricating a set of example welding spacers of progressively larger size.

The spacer body 4 may further include a central opening 16. The central opening 16 may be generally circular, such that the spacer body 4 is generally ring shaped. If desired, the central opening 16 may have a contour that is shape-matched to the peripheral edge 12 and, if present, the prongs 14 (or other deformable members). In FIG. 1, the central opening has a generally circular edge 18 with three cut-outs 20. The cut-outs 20 are situated radially inwardly from the prongs 14 and have the same shape. This configuration arises from the manner in which the spacer body 4 may be formed during manufacture. In particular, as shown in FIG. 3, a set for welding spacers 2a, 2b, 2c, 2d and 2e of varying size may be die-cut or otherwise removed from a single sheet 30 of spacer material. The spacers 2a-2e may be sequentially cut out from smallest to largest, or if desired, from largest to smallest. The smallest spacer 2e has a central opening that does not match its peripheral edge 12. This opening could be of any shape, but is preferably circular to allow unrestricted pipe interior viewing during assembly.

Figure 4:
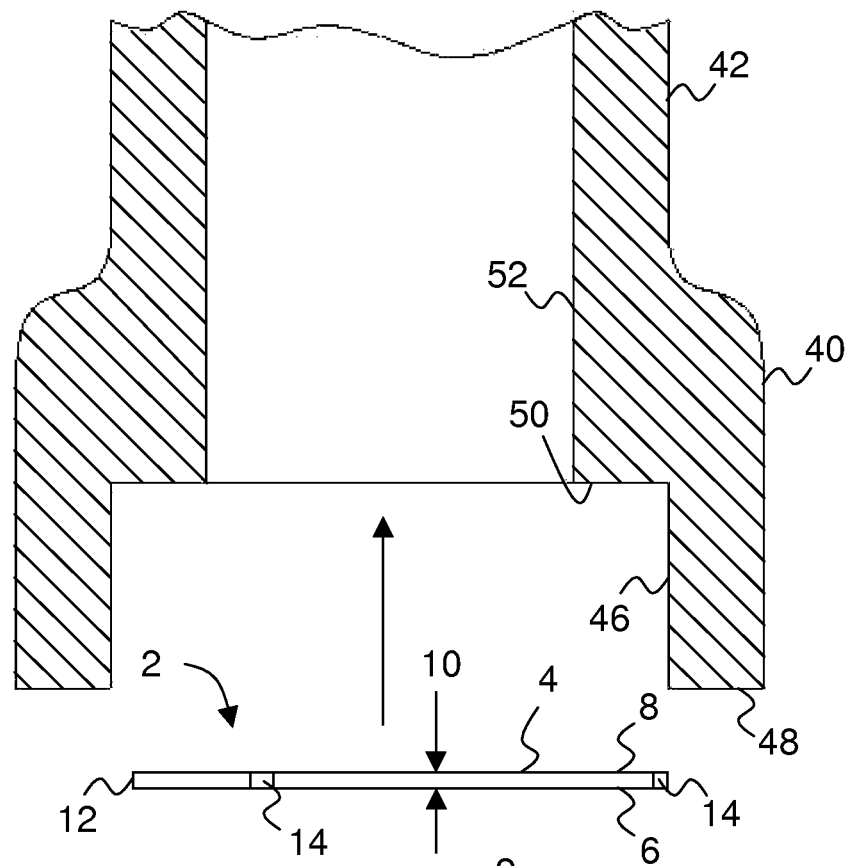
FIG. 4 is a cross-sectional centerline view of a pipe socket receiving the welding spacer of FIG. 1.
Figure 5:
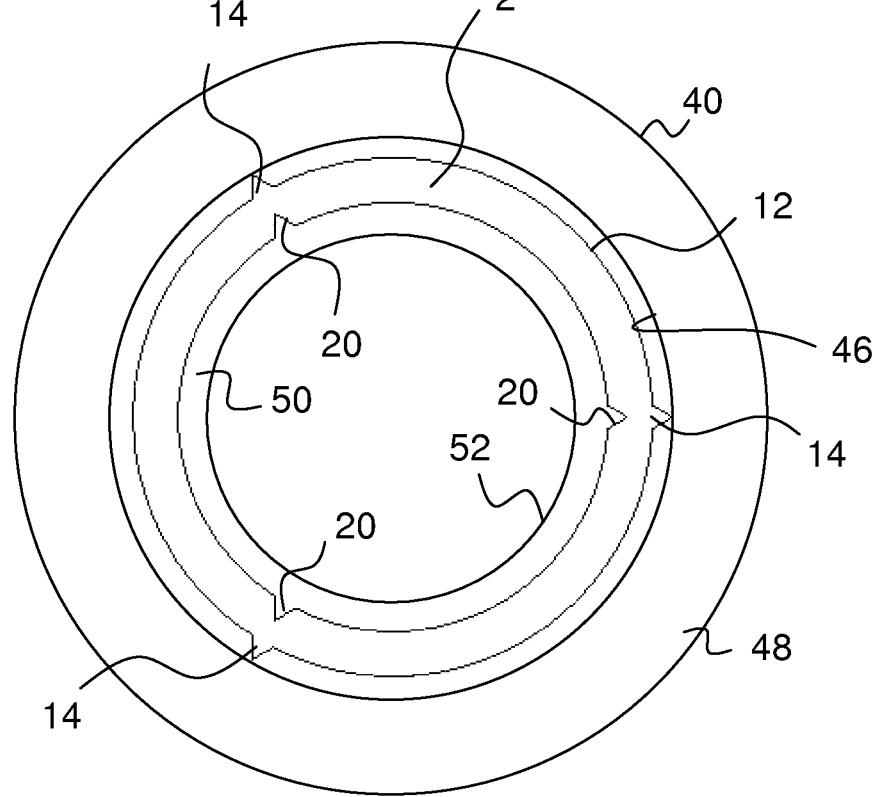
FIG. 5 is a plan view showing the open end of the pipe socket of FIG. 4 with the welding spacer of FIG. 1 seated therein.

Turning now to FIGS. 4 and 5, the welding spacer 2 is designed to be placed in a socket 40 that could be provided at the end of a first pipe segment 42. The socket 40 is designed to receive a second pipe segment 44 (see FIGS. 6-8) for welding. The socket 40 includes an outer bore 46 that extends longitudinally from the socket's open end face 48. The outer bore 46 terminates at an interior annular shoulder 50. The shoulder 50 extends radially inwardly from the outer bore 46 to an inner bore 52 of the socket 40. The inner bore also serves as the bore of the pipe segment 42, and will usually radially align with the inner bore of the second pipe segment 44 (as shown in FIGS. 4 and 5). The shoulder 50 provides a surface on which the welding spacer 2 may be seated, with the shoulder being in interfacial contact with the spacer's socket-engaging face 8.

The seated position of the welding spacer 2 is shown in FIG. 5. It will be seen that the prongs 14, if present, will engage the wall of the pipe segment's outer bore 46. The welding spacer 2 can be sized so that the radial extent of the prongs 14 is slightly larger than the diameter of the outer bore 46. This creates an interference fit that deforms the tips of the prongs 14 as the welding spacer 2 is inserted in the socket 40. The welding spacer 2 will thus be firmly held within the socket 40, and will not fall out even if the socket end face 48 points downwardly as shown in FIG. 4. Because the welding spacer 2 is generally ring-shaped, viewing of the pipe interior is not compromised during assembly.

Figure 6:
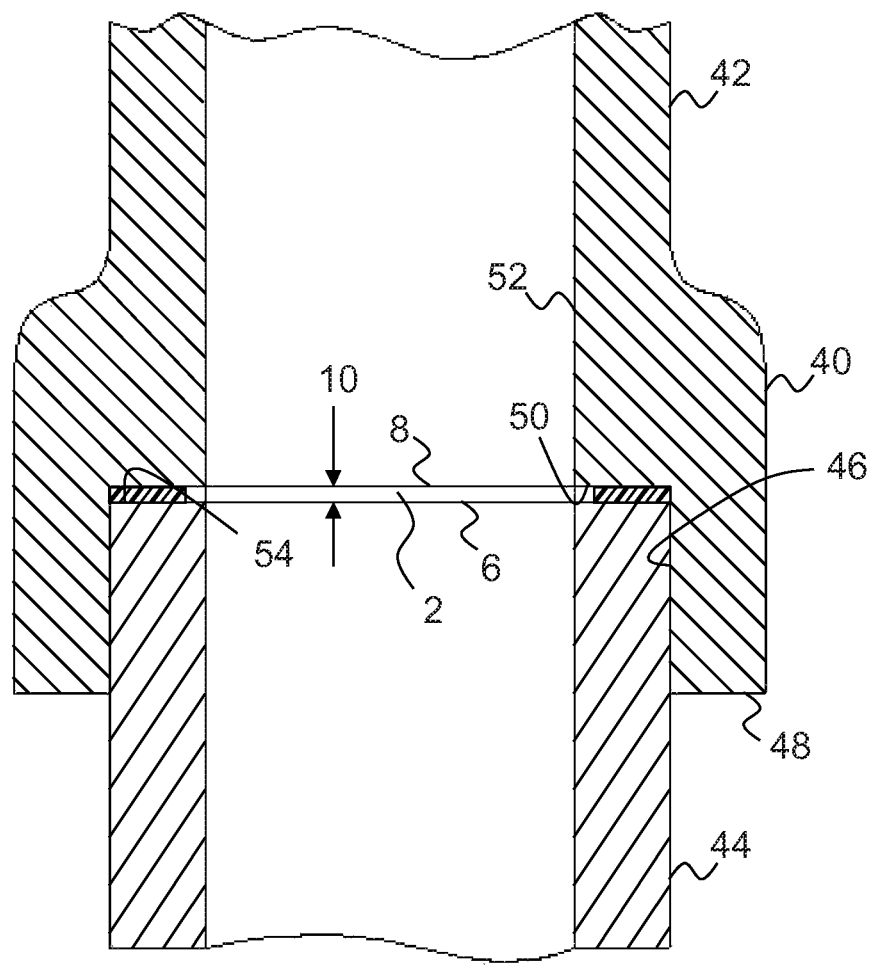
FIG. 6 is a cross-sectional centerline view of an unwelded pipe assembly comprising the pipe socket and the welding spacer of FIG. 4, and a pipe whose end is received in the pipe socket and seated against the welding spacer.

With additional reference now to FIG. 6, the welding spacer 2 will remain in position without any additional holding effort (if the prongs 14 are present) as the second pipe segment 44 is advanced into the socket 40. The second pipe segment 44 has a second pipe end 54 that seats against the pipe-engaging face 6 of the welding spacer 2. The welding spacer 2 will space the second pipe end 54 from the shoulder 50 by a gap amount equal to the thickness 10 of the spacer. This gap thickness may be selected according to the anticipated axial movement of the shoulder 50 and the second pipe end 54 toward each other due to thermal expansion.

Figure 7:
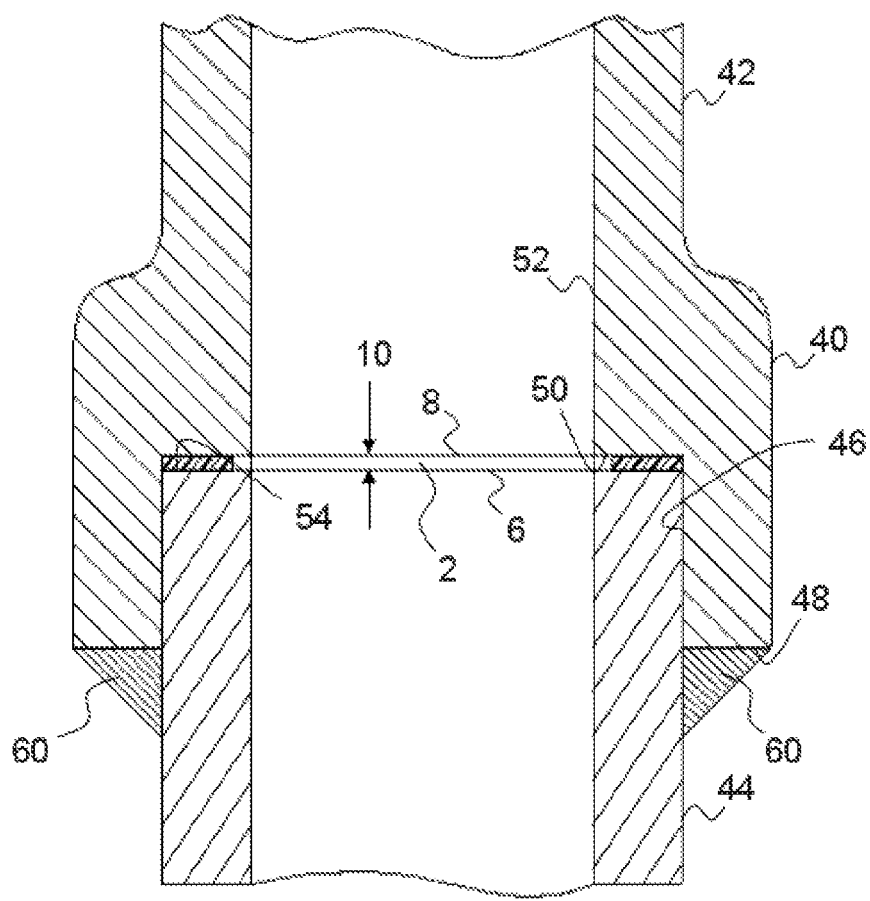
FIG. 7 is a cross-sectional centerline view showing the pipe assembly of FIG. 6 after the pipe socket has been welded to the pipe.
Figure 8:
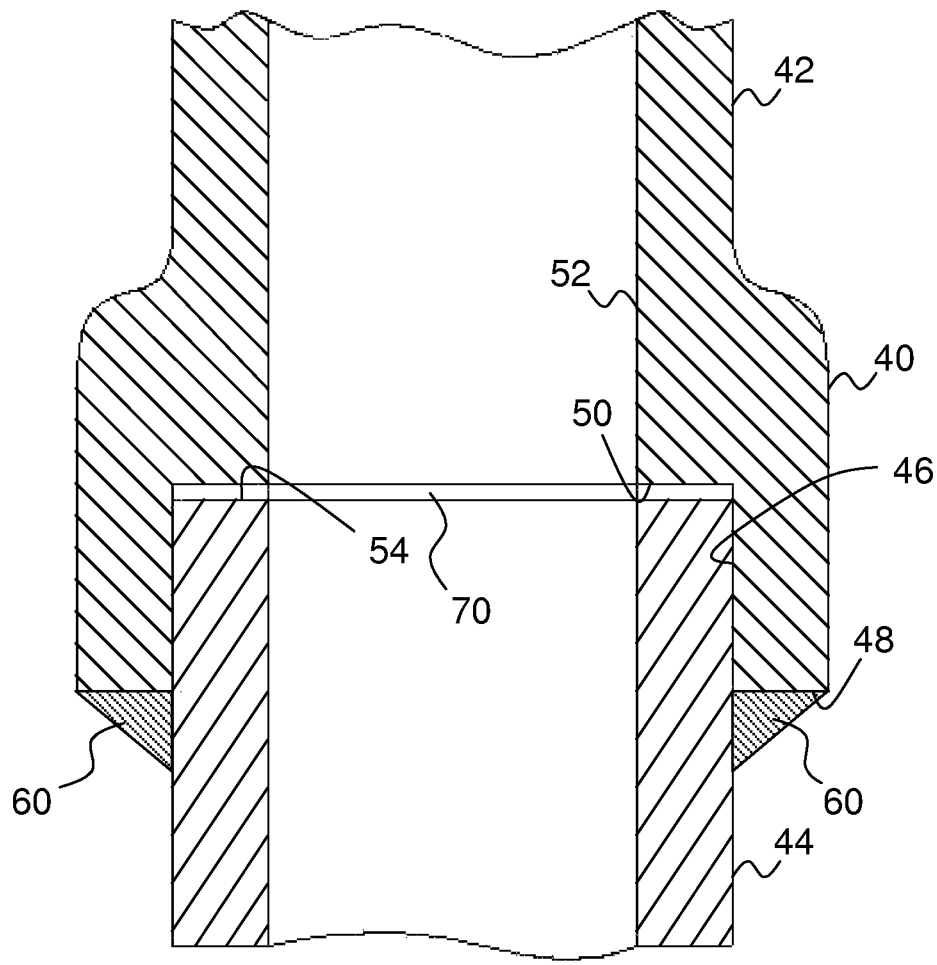
FIG. 8 is a cross-sectional centerline view showing the welded pipe assembly of FIG. 7 after the welding spacer has been removed.

As shown in FIG. 7, a socket weld 60 may be formed between the end face 48 of the socket 40 and the outer wall of the second pipe segment 44. As shown in FIG. 8, if the welding spacer 2 comprises a liquid-degradable material, it may be removed following welding by introducing a spacer-degrading liquid (such as water) into the interior of the pipe assembly. Once the spacer has been removed in this fashion, only an empty expansion gap 70 will remain between the shoulder 50 and the second pipe end 54.

Accordingly, a welding spacer has been disclosed. While various embodiments of the invention have been described, it should be apparent that many variations and alternative embodiments could be implemented in accordance with the teachings set forth herein. It will therefore be understood that the invention is not to be in any way limited except in accordance with the spirit of the appended claims and their equivalents.

What is claimed is:

1. A self-retaining welding spacer for welding together two pipe segments, comprising:
    a spacer body comprising a degradable paper or polymer material that can be installed in a pipe assembly that joins the two pipe segments to be welded and dissolved following welding to clear the pipe assembly of spacer material;
    a first pipe-engaging face on said spacer body;
    a second socket-engaging face on said spacer body;
    a spacer thickness separating said first pipe engaging face and said second socket-engaging face;
    a peripheral edge on said spacer body; and
    one or more deformable members on said peripheral edge configured to retain said welding spacer in a structure that is spaced from said peripheral edge.

2. The spacer of claim 1, wherein said spacer is substantially solid from said first pipe-engaging face to said second socket-engaging face.

3. The spacer of claim 1, wherein said spacer thickness is substantially uniform.

4. The spacer of claim 1, wherein said peripheral edge is continuous.

5. The spacer of claim 1, wherein said peripheral edge is substantially circular apart from said one or more deformable members.

6. The spacer of claim 1, wherein there are at least three of said one or more deformable members.

7. The spacer of claim 1, wherein said one or more deformable members comprise one or more deformable prongs.

8. The spacer of claim 1, wherein said spacer body comprises a central opening.

9. The spacer of claim 1, wherein said spacer body is generally ring shaped and comprises a central opening having a contour that is shape-matched to said peripheral edge and said one or more deformable members.

10. A pipe assembly for welding together two pipe segments, comprising:
    a first pipe segment having a socket at one end thereof;
    an interior shoulder on said socket;
    a welding spacer seated against said shoulder;
    a second pipe segment having a pipe end received in said socket; and
    said pipe end being seated against said welding spacer;
    said welding spacer comprising:
    a spacer body comprising a degradable paper or polymer material that can be installed in said pipe assembly and dissolved following welding to clear said pipe assembly of spacer material;
    a first pipe-engaging face on said spacer body engaging said pipe end;
    a second socket-engaging face on said spacer body engaging said shoulder;
    a spacer thickness separating said first pipe-engaging face and said second socket-engaging face;
    a peripheral edge on said spacer body; and
    one or more deformable members on said peripheral edge engaging an inside wall of said socket that is spaced from said peripheral edge.

11. The assembly of claim 10, wherein said spacer is substantially solid from said first pipe-engaging face to said second socket-engaging face.

12. The assembly of claim 10, wherein said spacer thickness is substantially uniform.

13. The assembly of claim 10, wherein said peripheral edge is continuous.

14. The assembly of claim 10, wherein said peripheral edge is substantially circular apart from said one or more deformable members.

15. The assembly of claim 10, wherein there are at least three of said one or more deformable members.

16. The assembly of claim 10, wherein said one or more deformable members comprise one or more deformable prongs.

17. The assembly of claim 10, wherein said spacer body comprises a central opening.

18. The assembly of claim 10, wherein said spacer body is generally ring shaped and comprises a central opening having a contour that is shape-matched to said peripheral edge and said one or more deformable members.

19. A self-retaining welding spacer, comprising:
  a spacer body comprising water soluble paper, a water soluble polymer or a combination thereof;
  a first pipe-engaging face on said spacer body;
  a second socket-engaging face on said spacer body;
  said first pipe-engaging face and said second socket-engaging face being separated from each other by a welding spacer thickness;
  a central opening in said spacer body;
  a peripheral edge on said spacer body spanning said spacer thickness;
  one or more deformable prongs on said peripheral edge each extending outwardly from adjacent portions of said peripheral edge in a direction that is away from said central opening to a pointed prong tip, said one or more deformable prongs being configured to self-retain said welding spacer in a pipe socket having an inner sidewall that is spaced from said adjacent portions of said peripheral edge by engaging said inner sidewall in an interference fit that deforms said prong tips; and
  said central opening having a peripheral contour that is shape-matched to said one or more deformable prongs and said adjacent portions of said peripheral edge, such that said central opening peripheral contour is identical in shape to a peripheral contour of said welding spacer but is of smaller size; and said spacer being substantially solid from said first pipe-engaging face to said second socket-engaging face.

* * * * *